United States Patent Office 3,004,683
Patented Oct. 17, 1961

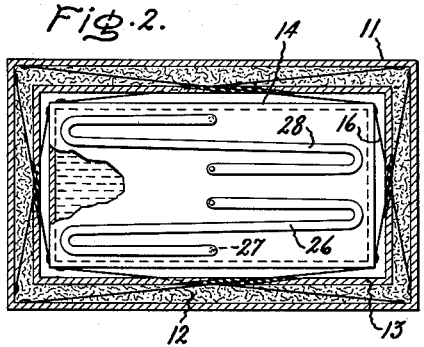
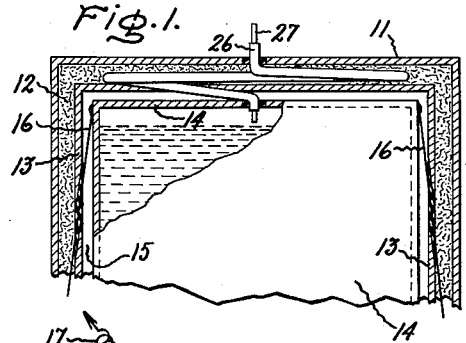
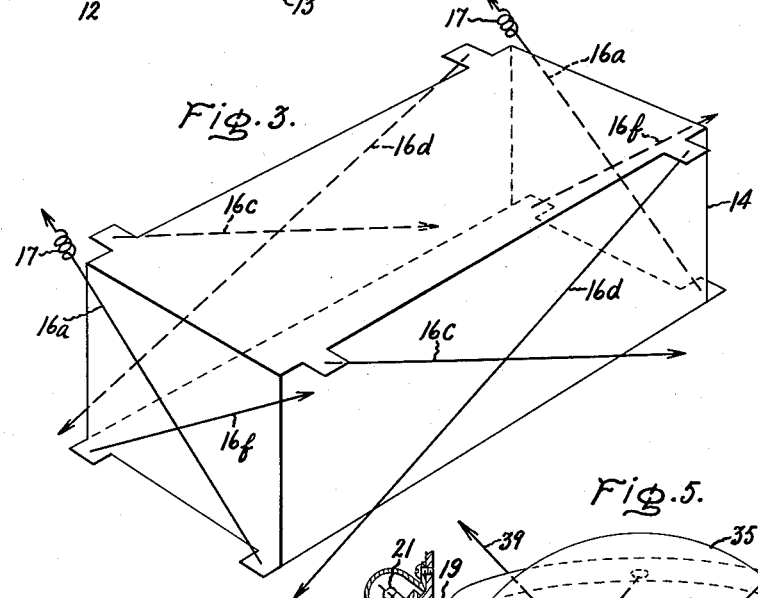
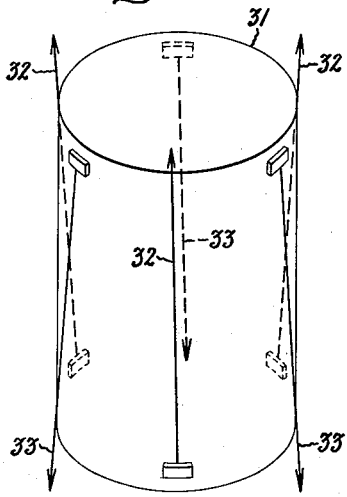
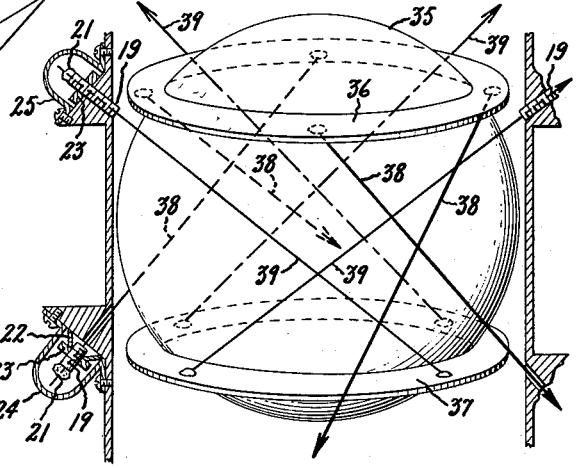
Inventors:
Theodor A. Buchhold,
Karl F. Schoch,
by Charles W. Helzer
Their Attorney.

3,004,683
INSULATING HOUSING
Theodor A. Buchhold, Schenectady, and Karl F. Schoch, Scotia, N.Y., assignors to General Electric Company, a corporation of New York
Filed Feb. 9, 1959, Ser. No. 791,953
2 Claims. (Cl. 220—15)

The present invention relates to thermally insulating housings.

More particularly, the invention relates to an insulated housing of novel construction for use with low temperature devices designed to operate in the neighborhood of zero degrees Kelvin.

In recent years emphasis has been focused on the possibility of constructing electrically operating devices from materials possessing superconductivity at extremely low temperatures to take advantage of the superconducting characteristic. To operate such devices in the superconducting region requires that their temperature be reduced to the neighborhood of zero degrees Kelvin (−273° F.). In order that the cost of operating such devices not be prohibitively high, it is essential that extremely good insulating housings be provided for such devices which reduce heat losses to an absolute minimum.

It is therefore a primary object of the present invention to provide a new and improved thermally insulated housing construction capable of operating at extremely low temperatures, and having very small heat losses while operating in this region.

In practicing the invention a thermally insulated housing is provided which includes an outer vacuum-tight container of reinforced construction. A layer of hollow glass fibre insulating material is disposed within this outer housing, and a median container having highly reflective sides is supported within the outer container on the glass fibre insulating material. A generally rectangular inner container is supported within the median container with the space between the inner and median containers being evacuated to a high vacuum. The inner container is secured within the median container by a pair of thin stay wires secured between each side of the inner container and the outer container in a pattern with the stay wires on two pairs of opposing sides connected from the bottom of the inner container to the top of the outer container, and the stay wires on the remaining pair of opposing sides being connected from the top of the inner container to the bottom of the outer container. In preferred embodiments of insulated housings constructed in the above manner, the stay wires on each side of the inner container are criss-crossed, and tensioning springs are connected to at least one pair of corresponding stay wires or one pair of opposing sides of the housing.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 1 is a partial sectional view of an insulated housing constructed in accordance with the invention;

FIGURE 2 is a partial cross-section view of the housing shown in FIGURE 1;

FIGURE 3 is a perspective view of a container comprising a part of the housing of FIGURES 1 and 2, and illustrates the manner in which it is supported within an outer housing member;

FIGURE 4 is a perspective view of an alternative form of container and method of supporting the same; and FIGURE 5 is a perspective view of still a third form of container and method supporting the same in accordance with the invention.

The insulating housing shown in FIGURE 1 of the drawings comprises an outer container 11 formed from stainless steel, aluminum or some other suitable material which is sufficiently strong to withstand differences in pressures thereacross. It is preferred that the walls of the container 11 be formed of about 1/32 inch thick stainless steel with a number of cross ribs, not shown, to provide structural support of the walls of the container. The container is preferably formed in the shape of a rectangular box, being fabricated out of sheet stainless steel with the corners thereof being welded together or otherwise secured to form a vacuum-tight enclosure. Packed in immediately adjacent the container 11 is a layer of insulation 12 which preferably comprises a form of glass fibre construction wherein the fibres of the glass are hollow. The glass fibre insulation 12 serves to support a median container 13 which likewise comprises a rectangular box-shaped container that has highly reflective surfaces. One suitable material for fabricating the median container 13 would be copper which is highly polished, however, aluminum or stainless steel or other material might be used. It is anticipated that the walls of the container 13 would be about two hundredths of an inch thick (.02″), however, it must be sufficiently strong to prevent distortion due to packing of the glass fibre insulation 12. The walls of the median container 13 are preferably pierced in a number of points to allow equalization of pressure on both its sides and to provide passageways for the thin stay wires comprising a part of the housing to be described hereinafter. The median container 13 surrounds an inner container 14 which together with the median container 13 defines a space 15 which is evacuated to a vacuum of about one micron. The inner container 14 also preferably comprises a rectangular shaped box formed from about 1/32 inch thick stainless steel sheeting which may be ribbed to provide structural strength since it is anticipated that the area within the inner container 14 will be approximately at atmospheric pressure. To reduce emissivity from the inner container all outer surfaces of this inner container should be highly polished.

The inner container 14 is rigidly held within the median container 13 by a plurality of thin stay wires 16 which are interconnected between the inner container 14 and the outer container 11. The stay wires do not contact the median container. A preferred pattern for the thin stay wires 16 is illustrated in FIGURE 3 of the drawings wherein the inner container 14 is shown in perspective view. The thin stay wires 16 are secured between inner container 14 and the outer container 11 in a pattern with the stay wires, 16a and 16b, for example, on two pairs of opposing sides of container 14 being connected from the bottom of the inner container to the top of the outer container 11, and the stay wires 16c and 16d for example, on the remaining pair of opposing sides of inner container 14 being connected from the top of inner container 14 to the bottom of the outer container 11. It is preferred that each pair of thin stay wires on each side of the container be criss-crossed as for example, 16a and 16b are criss-crossed, to further strengthen the support provided by the thin stay wires; however, the wires do not touch as they cross each other. The stay wires 16 themselves may comprise about two hundredths of an inch diameter stainless steel wire which is screw fastened, welded or otherwise secured under tension between the inner container 14 and the outer container 11 in a pattern such as described. It is also desirable in order to provide for contraction in the thin stay wires and the containers to include in one pair of corresponding stay wires on opposing sides of the container, for example stay wires 16a, a set of tensioning springs as indicated at 17.

The manner in which the inner stay wires 16 are secured intermediate the inner and outer container 14 and 11 may of course be varied. Two suitable connectors are shown in FIGURE 5 of the drawings in detail. For stay wires such as 16a where the wire is to be tensioned by a spring, to allow for contraction and the like, the stay wire 16 may be terminated in a threaded sleeve 19 which has a central passageway therethrough for the thin wire 16 which is secured to the sleeve by a welded bead or the like indicated at 21. The threaded sleeve 19 passes through a spring member 22 which in fact comprises a frustum of a cone fabricated from spring steel. The spring 22 abuts against a supporting wall of a container, such as a wall of the container 14 or a wall of the container 11, and a nut 23 is threaded over the end of the sleeve. Nut 23 is drawn down to engage the end of the Bellville washer 22 to thereby partly draw the thin stay wire 16 under tension against the action of the Bellville spring 22. In order to preserve the vacuum-tight character of the interior of a container with which such a fastener is used, a housing 24 may be fitted over such attachment. An alternate form of connector for use with the thin stay wire 16 where no spring tensioning is required is also illustrated in FIGURE 5. In this alternate form the connector may comprise a sleeve 19 fitted over the end of the thin wire 16 and secured thereto by a welded bead 21. In this embodiment of the connector, however, no spring member is required, hence the nut 23 is threaded directly over the threaded sleeve 19 to tension the thin stay wires 16 against the supporting container wall. Otherwise, the connector is entirely similar to that previously described. It is of course desirable that the passage through the container wall not impair the vacuum-tight integrity of the container, hence, a small housing 25 may be fitted over the ends of the connector in the manner shown to provide a vacuum tight enclosure.

As best shown in FIGURE 1 and FIGURE 2 of the drawings, the thin stay wires 16 pass between the inner and outer containers through openings in the walls of median container 13, and these openings may also serve to equalize the pressure on both sides of the median container walls since the space 15 is under a high vacuum. This arrangement allows the space not filled by the packed glass fibres 12 intermediate the median container 13 and the outer container 11 to be partially evacuated thereby improving its insulation qualities. In order to supply a liquid coolant to the interior of the inner container 14, an S-shaped coaxial conduit is provided which is formed from an outer tubular conduit 26 surrounding an inner conduit 27. The supply conduits 26 and 27 pass through a vacuum-tight seal in the top of the outer and inner containers and has an S-shaped turn, best shown in FIGURE 2 of the drawings, disposed in the space intermediate the median container 13 and the outer container 11 to allow for expansion and contraction in the conduit as well as to provide a very high resistance to heat flow through the conduit walls which may be about .003 inch thick. An additional single conduit 28 which is similarly shaped in the form of an S may also be connected in through vacuum tight openings in the inner and outer containers to the interior of container 14 for venting gases accumulated in the top of the container. Such additional conduit may also be used to run in electrical leads and the like for any equipment that might be located within the container 14 which requires electrical energization.

From the foregoing description, it can be appreciated that the invention provides a new and improved mechanical supporting structure for bodies of widely varying temperature for providing against heat losses between the two widely varying temperature bodies. This occurs by reason of the very long and low conductivity path presented by the thin stay wires 16 to the container bodies which they interconnect. The additional layers of glass fiber insulation, and evacuated space, together with the highly polished surfaces coact with this low conductivity structural supporting arrangement to provide a highly efficient thermal insulating housing. By reason of this construction the inner container may be used to hold cryogenic fluids such as liquid helium for extremely long periods of time with very little loss of the fluid due to heat gain as a result of the housing being located in a region of high ambient temperatures. The unique construction of the housing allows for very rigid positioning of a cryogenic fluid filled inner container within an insulating outer container with an extremely low evaporation rate of the cryogenic fluid due to heat in flux to the fluid. The heat gains into the inner container using this construction are reduced to the point where the amount of cryogenic fluid required to maintain low operating temperatures is sufficiently low to make certain applications of low temperature devices practical. Calculations indicate that a 3.5 liter container of liquid helium will lose only approximately .3 of a liter per hour when the ambient temperature is 300 degrees Kelvin.

An alternative shape for the containers to be supported by thin stay wires in the manner made available by the present invention is shown in FIGURE 4 of the drawings. In the FIGURE 4 embodiment, a cylindrical container 31 is supported by a network of thin stay wires which are strung under tension between the container 31 and a surrounding outer container not shown which may have the same shape. The network of thin stay wires is made up of a first set of thin stay wires 32 which are connected to the lower end or bottom of the cylindrical container 31 at points which are spaced equidistant around its circumference. Since there are three stay wires 32 the connections will be at three equidistant points. It is of course obvious that the thin stay wires may be connected in the manner shown in FIGURE 5 of the drawings, and also that if additional stay wires are desired, their connections would be spaced equidistantly at different points around the circumference of the cylinder 31. A second set of stay wires 33 are likewise connected at points spaced equidistant around the circumference of the cylindrical body 31 at its upper end. The two sets of thin stay wires 32 and 33 then coact upon being placed under tension to rigidly hold the cylindrical body 31 in the manner illustrated.

Still a different form of container which may be supported in a novel insulating housing constructed in accordance with the invention is shown in FIGURE 5. In the FIGURE 5 embodiment, a spherical housing 35 is provided which has a pair of circular caps 36 and 37 supported thereover. The circular caps 36 and 37 each have a plurality of thin stay wires 38 interconnected between points on cap spaced equidistant around its periphery which extend down to an outer supporting wall similar to the outer container 11 in the species of FIGURE 1 of the invention. An additional set of thin stay wires 39 are secured to cap 37 at equidistant points around its periphery, and extend up to a point on an outer container (not shown). Accordingly, it can be appreciated that even oddly shaped containers like a sphere may be supported within an insulated housing in the manner taught by the present invention.

Having described several embodiments of an insulated housing constructed in accordance with the invention, it is believed obvious that many modifications and variations of the present invention are possible in the light of the above teachings. It is therefore to be understood that changes may be made in the particular embodiments of the invention described which are within the full intended scope of the invention as defined by the appended claims.

What we claim as new and desire to secure by Letters Patent of the United States is:

1. A thermally insulated housing comprising an outer vacuum tight container of reinforced construction, a layer of hollow glass fiber insulating material, a median container having highly reflective sides supported within said outer container on said glass fiber insulating material, and a generally rectangular inner container supported within said median container with at least the space between said inner and median containers being evacuated to a high degree of vacuum, said inner container being secured within said median container by a pair of thin stay wires secured between each side of said inner container and said outer container in a pattern with the stay wires on two pairs of opposing sides connected from the bottom of the inner container to the top of the outer container, and the stay wires on the remaining pair of opposing sides connected from the top of the inner container to the bottom of the outer container.

2. The combination set forth in claim 1 wherein the stay wires on each side of said inner container are crisscrossed, and further characterized by tensioning springs connected to corresponding stay wires of one pair of opposing sides.

References Cited in the file of this patent

UNITED STATES PATENTS

| | | |
|---|---|---|
| 883,479 | Place | Mar. 31, 1908 |
| 2,045,000 | Smith | June 23, 1936 |
| 2,547,607 | Sulfrian | Apr. 3, 1951 |
| 2,699,583 | Kurtz | Jan. 18, 1955 |
| 2,683,297 | Johnston | Dec. 9, 1958 |
| 2,926,810 | Yeager | Mar. 1, 1960 |

FOREIGN PATENTS

| | | |
|---|---|---|
| 677,326 | Great Britain | Aug. 13, 1952 |